June 17, 1930. L. RONDOLIN 1,764,280
MACHINE FOR CUTTING BISCUITS FROM DOUGH
Filed Aug. 29, 1929 2 Sheets-Sheet 1

Inventor
Laurent Rondolin
By Dowell & Dowell
Attorneys.

June 17, 1930.  L. RONDOLIN  1,764,280
MACHINE FOR CUTTING BISCUITS FROM DOUGH
Filed Aug. 29, 1929   2 Sheets-Sheet 2

Patented June 17, 1930

1,764,280

UNITED STATES PATENT OFFICE

LAURENT RONDOLIN, OF BERMONDSEY, LONDON, ENGLAND, ASSIGNOR TO LAURENT RONDOLIN AND PEEK FREAN & COMPANY, LIMITED, BOTH OF LONDON, ENGLAND

MACHINE FOR CUTTING BISCUITS FROM DOUGH

Application filed August 29, 1929, Serial No. 389,260, and in Great Britain April 26, 1929.

In the manufacture of biscuits from sheet dough modern conditions demand that the operations shall be as far as possible continuous and effected with a minimum of supervision and loss. Accordingly it is now usual to convey the sheet of dough past cutters by a travelling web upon which severed blanks are left collectively surrounded by a margin of waste destined to be later removed so that the blanks alone continue their course in proper spaced relationship for subsequent treatment.

One way of removing the waste, consists in causing it to be received by a separate travelling web disposed at a height such that there is a gradual lift of the waste sheet, the biscuit blanks which are left in situ passing beneath the said separate web while the surplus is conducted, it may be, to a re-sheeter. In the normal way such an arrangement is quite satisfactory, but supervision is necessary inasmuch as it is not uncommon for some variation to occur which interferes with proper progress, notably a break in the skeleton waste sheet.

The object of the present invention is to enable supervision at this stage in the manufacture of biscuits, or analogous articles from plastic material in sheet form, to be dispensed with or reduced to less frequent inspections, at the same time securing another prominent advantage, namely the possibility of being able to reduce the distance which separates individual blanks, at present determined largely by the strength which it is necessary the skeleton sheet should possess to permit of the stripping by the method referred to.

Broadly the invention consists in arranging that the skeleton waste sheet in addition to being raised by the travelling stripping web referred to, shall be lifted at a position nearer the cutters. This may be effected by inserting prong means in the dough, or equivalent, while it is upon the main supporting web, raising the prongs to lift the dough and mechanically stripping the dough from the prongs whilst being lifted.

The means employed may take various forms, the prongs being if desired movable to a certain degree in the direction of travel, the stripping means being likewise movable in any desired way, or both the prongs and stripping means having appropriate movements imparted thereto.

Figure 1:
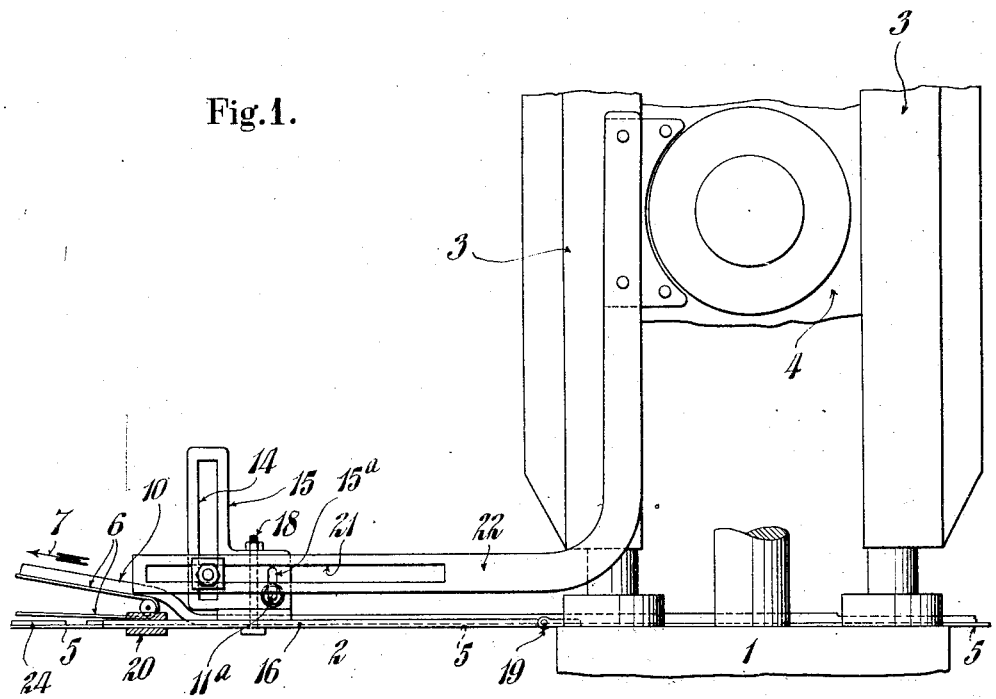
Figure 2:
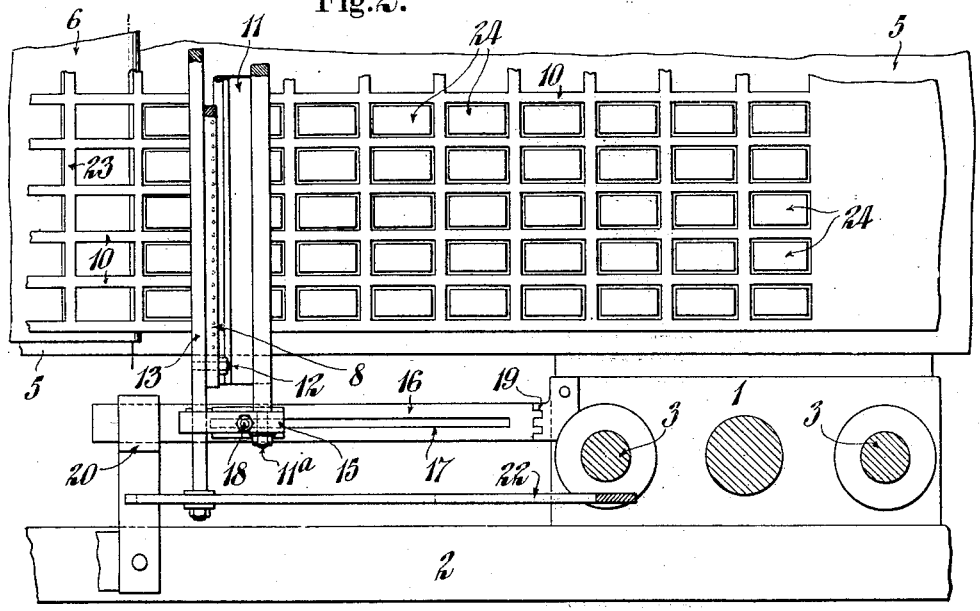

In the accompanying drawings, Fig. 1 is a side elevation, with a part in section, of so much of a biscuit cutting machine as is necessary to an understanding of one constructional embodiment of the invention. Fig. 2 is a corresponding plan also with parts in section and broken away. Figs. 3, 4, 5 and 6 are views, to a larger scale, of parts of Fig. 1 diagrammatically illustrating their operative relationship at different positions.

The parts of the machine which are well known may be stated to be a cutting table 1 which reciprocates in relation to the stationary frame 2 of the machine and which carries guides 3 up and down with which the cutter beam 4 is movable. 5 is the travelling web upon which the sheet of dough is carried past the cutter beam, the beam and this web moving in unison during forward travel of the beam. The travelling web adapted to receive the skeleton waste sheet is shown at 6, its travel being indicated by the arrow 7 Fig. 1.

According to the example of stripping means constituting the invention chosen for illustration, there is arranged transversely of the machine a beam or support 8 having a series of uniformly spaced depending prongs 9 adapted to be inserted in a straight line in that part of the skeleton sheet 10 which exists between the trailing edges of one row of biscuit blanks and the leading edges of the biscuit blanks of a following row. These prongs 9 are disposed to move vertically in more or less close proximity to a stationary stripping plate 11 also extending transversely across the machine, the arrangement being such that the dough when sufficiently elevated by the prongs is arrested by the stripping plate 11, allowing the prongs to withdraw and free the material.

The beam or support 8 is secured in a vertically adjustable manner as by bolts 12 to an actuating bar 13 which extends through vertical guide slots 14 in end brackets 15, said brackets being carried by arms 16 secured to the table 1 so that they follow the movements of the latter. The arms 16 are slotted as at 17 so that by means of bolts 18 the brackets 15 can be adjusted in position therealong and in case the table has not a true straight line motion its connection thereto is advantageously effected by a hinge joint 19, the free end of the arm working loosely through a guide 20 attached to the frame 2. The ends of the actuating bar 13 work in horizontal slots 21 in guide members 22 adapted to rise and fall with the cutter beam 4 to which they are attached. Similarly the stripping plate 11 may be vertically adjustable, being shown as attached to the brackets 15 by bolts $11^a$ working in slots $15^a$.

Figure 3:
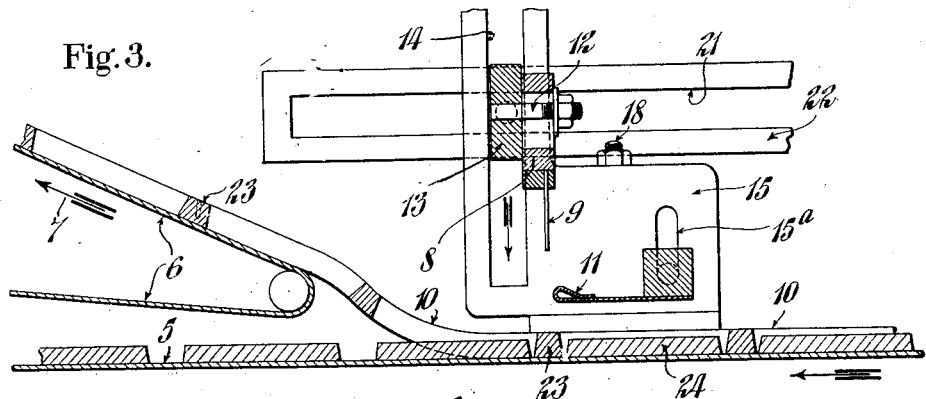
Figure 4:
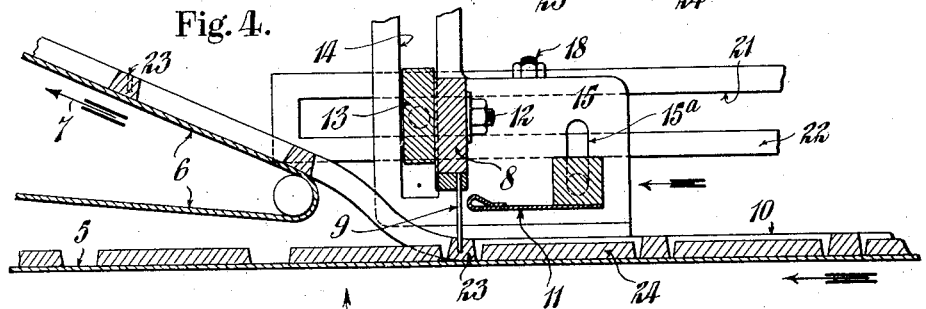
Figure 5:
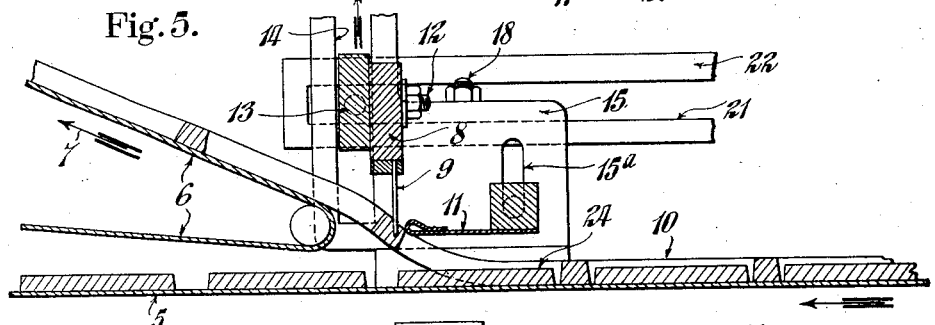
Figure 6:
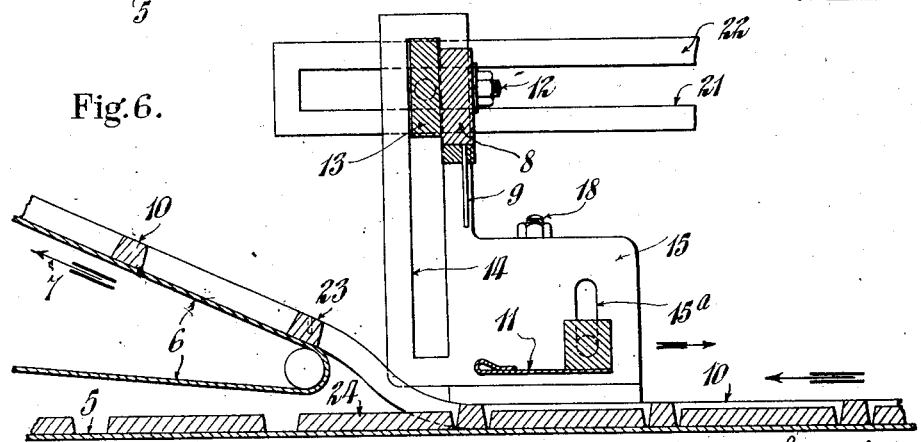

The operation of the arrangement will be understood from Figs. 3, 4, 5 and 6. In Fig. 3 the prongs 9 are in the position corresponding to commencement of the forward stroke of the table, 23 representing the rib of dough in advance of a biscuit blank 24 which rib it is desired to assist on its way to the web 6. At the mid forward stroke of the table the parts will assume the position shown in Fig. 4, the prongs having entered the rib 23. At the end of the forward stroke of the table the prongs 9 are leaving the rib 23 as shown in Fig. 5, the rib being acted upon by the stripping plate 11. At the middle of the return stroke of the table the parts occupy the position shown in Fig. 6 after which the cycle described is repeated.

It will be found by means of the present invention that any liability of the skeleton sheet to stick or drag when it is to be removed will be overcome by the lifting action of the prongs and that there is little liability of the skeleton sheet to break.

What I claim is:—

1. In a machine of the kind referred to, the combination with a travelling supporting web for the blanks and scrap material and a second travelling web onto which the first one delivers the scrap material alone, of prong means adapted to be inserted in the scrap material while on the first said supporting web, means whereby the prongs are raised to lift said scrap material while being directed onto the second travelling web and means for mechanically stripping the waste sheet from the prongs while being thus lifted.

2. In a machine of the character described, a reciprocating table and a cutter beam movable therewith, said beam being also movable vertically; a stripping plate adapted to reciprocate with the table; and prongs adapted to be moved vertically with the cutter beam so as to pass in close proximity to the stripping plate, as and for the purpose set forth.

Signed at London, England, this 13th day of August, 1929.

LAURENT RONDOLIN.